(12) United States Patent
Wilson et al.

(10) Patent No.: US 6,770,898 B1
(45) Date of Patent: Aug. 3, 2004

(54) METHOD OF VERIFYING THE AUTHENTICITY OF A SECURITY DOCUMENT AND DOCUMENT FOR USE IN SUCH A METHOD

(75) Inventors: Gerard Joseph Wilson, Fitzroy (AU); Paul Zientek, North Carlton (AU)

(73) Assignee: Securency Pty Ltd., Craigieburn (AU)

( * ) Notice: Subject to any disclaimer, the term of this patent is extended or adjusted under 35 U.S.C. 154(b) by 0 days.

(21) Appl. No.: 09/600,824

(22) PCT Filed: Jan. 18, 1999

(86) PCT No.: PCT/AU99/00039

§ 371 (c)(1),
(2), (4) Date: Sep. 8, 2000

(87) PCT Pub. No.: WO99/37488

PCT Pub. Date: Jul. 29, 1999

(30) Foreign Application Priority Data

Jan. 21, 1998 (AU) .............................................. PP1427
May 21, 1998 (AU) .............................................. PP3632

(51) Int. Cl.[7] .............................................. G06K 5/00
(52) U.S. Cl. .......................... 250/556; 283/72; 283/85
(58) Field of Search .............................. 250/558, 556; 283/113, 67, 70, 72, 74, 85, 94, 98, 106, 107, 109, 110, 111; 428/916; 235/488, 490, 487, 489, 494; 356/71

(56) References Cited

U.S. PATENT DOCUMENTS

| | | | |
|---|---|---|---|
| 4,536,016 A | * 8/1985 | Solomon et al. | 283/111 |
| 5,275,870 A | 1/1994 | Halope et al. | |
| 5,393,099 A | * 2/1995 | D'Amato | 283/91 |
| 5,449,200 A | * 9/1995 | Andric et al. | 283/67 |
| 5,546,198 A | 8/1996 | van der Gracht et al. | |
| 5,678,863 A | * 10/1997 | Knight et al. | 283/113 |
| 5,892,239 A | * 4/1999 | Nagase | 250/556 |
| 6,270,610 B1 | * 8/2001 | Benoit et al. | 156/220 |

FOREIGN PATENT DOCUMENTS

| | | | | |
|---|---|---|---|---|
| DE | 3208204 | 9/1983 | | |
| EP | 655316 | 5/1995 | | |
| GB | 2268906 | 1/1994 | | |
| WO | WO 83/00659 | 3/1983 | | |
| WO | WO 94/29105 | 12/1994 | | |
| WO | WO 94/29119 | * 12/1994 | ........... | B42D/15/00 |
| WO | WO 97/47478 | * 12/1997 | ........... | B42D/15/00 |
| WO | WO 98/15418 | 4/1998 | | |
| WO | WO 98/32590 | 7/1998 | | |

* cited by examiner

*Primary Examiner*—Edward J. Glick
*Assistant Examiner*—C Kao
(74) *Attorney, Agent, or Firm*—Christensen O'Connor Johnson Kindness PLLC (57) ABSTRACT

Method of verifying the authenticity of a security document (1), the security document including a first at least partially transparent portion (7, 8) and an optical projection element (9) within or superposed with the first at least partially transparent portion (7, 8), the optical projection element (9) acting to transform a light beam (10a) passing from a light beam source through said first at least partially transparent portion (7, 8) into a patterned beam (11) of selected design, the method including the steps of: positioning the security document such that the light beam is transmitted through the first at least partially transparent portion and the patterned beam is projected onto a viewing surface (14), and verifying the presence of a patterned image by the impingement of the patterned beam on the viewing surface (14).

30 Claims, 5 Drawing Sheets

FIG_7.

FIG_8.

ically carried out by many retail outlet staff and like
METHOD OF VERIFYING THE AUTHENTICITY OF A SECURITY DOCUMENT AND DOCUMENT FOR USE IN SUCH A METHOD This is a United States national stage application of International application No. PCT/AU99/00039, filed Jan. 18, 1999, the benefit of the filing date of which is hereby claimed under 35 U.S.C. § 120, which in turn claims the benefit a Australian application No. PP 1427 filed Jan. 21, 1998, and No. PP 3632, filed May 21, 1998, the benefit of the filing date of which is hereby claimed under 35 U.S.C. § 119.

FIELD OF THE INVENTION

The present invention relates to security documents such as banknotes or the like including security devices for visually verifying the authenticity of the security document, and is particularly concerned with the use of a light source which interact with the security device to enable such visual verification.

BACKGROUND OF THE INVENTION

A wide variety of security devices for security documents, such as banknotes, traveller's cheques, or the like, have been previously proposed. Such security devices are provided in order to make falsification and counterfeiting of the security documents difficult. Amongst those considered to be effective for use in banknotes and like security documents are security devices which modify the characteristics of an impinging light beam. Such modification is generally detected by a photo-sensitive device which detects the light beam reflected from the security document and, by analyzing the characteristics of the reflected beam, verifies the authenticity of the security document. According to one known security document verification system, a diffractive device is applied to the surface of a banknote. The output of a laser diode is passed through a lens system to produce a beam of light which is deflected onto the diffractive device on the surface of the banknote. The diffractive device reflects the incident beam to thus generate a diffracted beam. One or more images are produced by projecting the diffracted beam onto a viewing screen. The characteristics of the diffractive device are chosen so that a preselected image is reflected onto the viewing screen, thus enabling the visual verification of the authenticity of the security document.

Such methods of verification, however, require the use of a complex system of dedicated laser beam sources, mirrors, lenses and projected image viewing screens. Accordingly, verification of the authenticity of security documents bearing such security devices is only possible by persons possessing the necessary verification equipment, and cannot be conveniently carried out by many retail outlet staff and like persons who wish to verify the authenticity of banknotes, cheques, traveller's cheques and such documents.

The aim of the invention is to provide a method of verifying the authenticity of a security document, which method is simple and convenient to use for a large number of persons who would wish to do so.

A further object of the invention is to provide a method of verifying the authenticity of a security document which does not require complex, dedicated verification equipment.

Another object of the invention is to provide a method of verifying the authenticity of a security document which ameliorates or overcomes problems of known o authenticity of security documents.

SUMMARY OF THE INVENTION

With thin m mind, one aspect of the present invention provides a method of verifying the authenticity of a security document, the security document including a first at least partially transparent portion and an optical projection element within or superposed with the first at least partially transparent portion, the optical projection element acting to transform a light beam passing from a light beam source through said first at least partially transparent portion into a patterned beam of selected design, the method including the steps of:

positioning the security document such that the light beam is transmitted through the first at least partially transparent portion and the patterned beam is projected onto a viewing surface, and verifying the presence of a patterned image by the impingement of the patterned beam on the viewing surface.

Preferably, the security document also includes an opacifying portion, the method further including the step of:

folding the security document such that the patterned beam is caused to impinge upon the opacifying portion which thus acts as the viewing surface.

Preferably, the opacifying portion of the security document is remote from the first at least partially transparent portion.

Preferably, the light beam source is a directional light beam source. In one embodiment, the light beam source is a point-of-sale light source device, such as a laser or an LED based device.

Conveniently, the light beam source may be a bar code scanner.

In one embodiment, the optical projection element acts to generate the patterned beam by diffraction of the light beam transmitted through the security document.

Advantageously, the security document may include a second at least partially transparent portion, the method further including the step of:

folding the security document such that part only of the light beam from the light beam source passes firstly through the second at least partially transparent portion before being transmitted through said first at least partially transparent portion, said second at least partially transparent portion thus acting as a pseudo point light source.

In one embodiment of the invention, the security document includes an optical image or device, applied to the opacifying portion, which interacts with the patterned beam impinging on the opacifying portion to create a visual security effect, the method further including the step of:

verifying the presence of the visual security effect.

The optical image or device may be, for example, a printed image substantially corresponding to or complementing the patterned image projected onto the viewing surface. In addition, the optical image or device may be a reflective foil OVD or other like device.

Another aspect of the invention provides a security document including a first at least partially transparent portion and an optical projection element within or superposed with the first at least partially transparent portion, the optical projection element acting to transform a light beam passing from a light beam source through the first at least partially transparent portion into a patterned beam of selected design.

Preferably, the security document further includes an opacifying portion for impingement of the patterned beam thereupon.

The opacifying portion and the first at least partially transparent portion are preferably remote from each other.

In one embodiment, the optical projection element acts to generate the patterned beam by diffraction of the light beam passing through the security document.

In a preferred embodiment of the invention, the security document includes an at least partially transparent substrate having first and second opposing faces, and an opacifying layer applied to at least one of the faces, the first at least partially transparent portion beam applied to leave an uncoated area on the at least one surface.

The security document may include a second at least partially transparent portion for transmitting part only of the light beam from the light beam source, the second at least partially transparent portion thus acting as a pseudo point light source.

In one embodiment of the invention, the security document includes an optical image or device, applied to the opacifying portion, which interacts with the patterned beam impinging on the opacifying portion to create a visual security effect.

A further aspect of the present invention provides a method of producing a security document as described above, including the steps of:

forming an at least partially transparent substrate having first and second opposing surfaces, coating at least one face of the substrate within an opacifying layer, the opacifying layer being applied to leave a first uncoated area on the at least one surface, conveying the optical projection element into position over the first uncoated area, and transferring the optical projection element onto the substrate.

In one variant, the optical projection element is conveyed into position over the first uncoated area by and on a transfer foil.

Preferably the optical projection element is transferred from the foil onto the substrate by hot stamping.

It is preferably that at least one optically variable device is also conveyed into position over the first uncoated area and transferred onto the substrate together with the optical projection element.

According to another variant, the optical projection element may be transferred onto or into the substrate by embossing.

In one embodiment of the method of producing a security document, the opacifying layer is applied to also leave a second uncoated area on the at least one surface, the second uncoated area acting as a pseudo point light source when a light beam passes through the security document in the second uncoated area.

The method of producing a security document may also include the step of:

applying an optical image or device to an opacifying portion of said opacifying layer.

The optical image or device may be applied to the opacifying portion by printing.

The optical image or device may alternatively be a reflective foil OVD or like device and may be applied to the opacifying layer in the same manner as the optical projection element.

Yet another aspect of the present invention provides a method of verifying the authenticity of a security document, the security document including a first at least partially transparent portion, and an optical projection element within or superposed with the first at least partially transparent portion, the optical projection element acting to transform a light beam passing from a light beam source through said first at least partially transparent portion into a patterned beam of selected design, the method involving the steps of:

positioning the security document so as to enable a user to look at the light beam source through the first at least partially transparent portion, and verifying the presence of an image corresponding to the patterned beam in the user's field of vision.

Conveniently, the light beam source may produce substantially collumated light, and this collumated light may be white light.

Preferably, the light beam source is located at a sufficiently remote distance from the security document that the light beam passing through the optical projection element is substantially collumated light.

In one embodiment of the invention, the light beam source produces substantially non-collumated light, the method including the step of:

placing a screen having a window between the light beam source and the optical projection element, such that the light beam from the light beam source passing through the window is substantially collumated light.

The screen may be constituted by an opacifying portion of the security document.

The window may be constituted by a second at least partially transparent portion of the security document.

Preferably, the first and second at least partially transparent portions are remote from each other in order to enable the window to be conveniently placed between the light beam source and the optical projection element.

A further aspect of the invention provides a security document including a first at least partially transparent portion, an optical projection element within or superposed with the first at least partially transparent portion, the optical projection element acting to transform a light beam passing from a light beam source through said first at least partially transparent portion into a patterned beam of selected design, and a second at least partially transparent portion located remotely from the first at least partially transparent portion, the security document being foldable such that the second at least partially transparent portion is able to be placed between the light beam source and the optical projection element in order that the light beam from the light beam source passing through the second at least partially transparent portion is substantially collumated light.

The following description refers in more detail to the various features of the present invention. To facilitate an understanding of the invention, reference is made in the description to the accompanying drawings where the method of verifying the authenticity of a security document, the security document for use in such a method and the method of producing such a security document are illustrated in preferred embodiments. It is to be understood that the present invention is not limited to the preferred embodiments as illustrated in the drawings.

DESCRIPTION OF THE PREFERRED EMBODIMENTS

Figure 1:
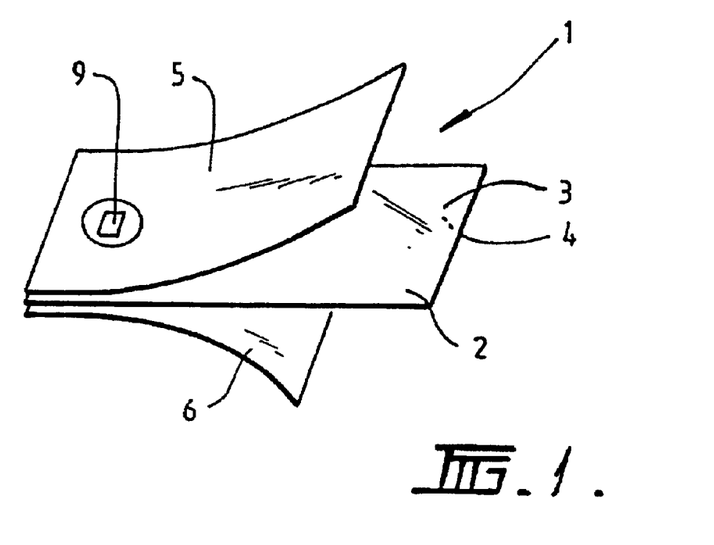
FIG. 1 is a schematic perspective view showing one embodiment of a security document according to the present invention.

Referring now to FIG. 1, There is shown a security document 1 comprising an at least partially transparent substrate 2 having first and second opposing faces 3 and 4. Opacifying layers 5 and 6 are respectively applied to the faces 3 and 4 of the substrate 2. The security document 1 may be a banknote comprising a clear plastic substrate having one or more opacifying layers of ink on one or both of its opposing faces. The clear plastics substrate is preferably formed of a transparent polymeric material, such as PE, PP or PET, which may be made up of at least one biaxially oriented polymeric film. The substrate may comprise a single layer of film of polymeric material. Alternatively, the substrate may comprise a laminate of two or more layers of transparent biaxially oriented polymeric film.

The present invention also applies to banknotes and other security documents formed substantially of paper or other non-transparent material. In such a case, an aperture may be formed in the paper and a transparent patch of polymeric material or other transparent film may be applied to the surface of the security document in order to cover the aperture.

The opacifying layers of printed material may comprise one or more of a variety of opacifying inks which can be used in the printing of banknotes or other security documents. For example, the layers of opacifying ink may comprise pigmented coatings comprising a pigment, such as titanium dioxide, dispersed within a binder or carrier of cross-linkable polymeric material.

Figure 2:
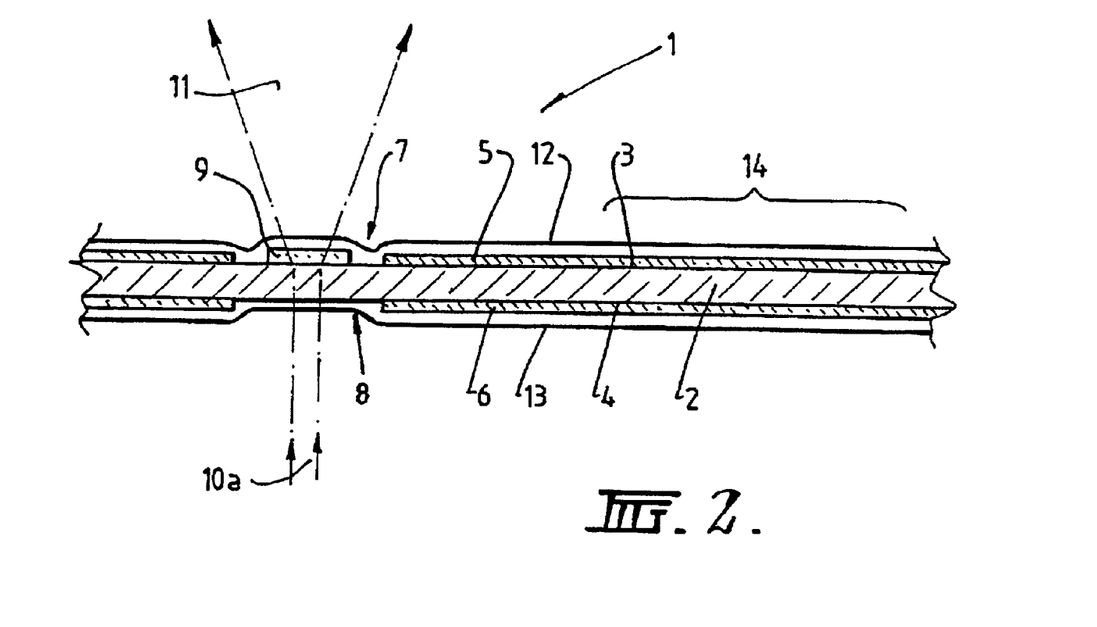
FIG. 2 is a cross-sectional side view of the security document of FIG. 1.

As seen in FIG. 2, the opacifying layers 5 and 6 are applied to the faces 3 and 4 of the substrate 2 to leave uncoated areas 7 and 8. These areas are superposed so that an at least partially transparent window is formed through the security document. Alternatively, in the case where only one of the faces 3 and 4 of the substrate 2 is covered by an opacifying layer, a single uncoated area may define such a window.

The security document 1 also includes an optical projection element 9 which acts to transform a portion 10a of a light beam 10 from a light beam source through the at least partially transparent portion of the security document (the window created through the security document) into a patterned beam 11 of selected design. The optical projection element may be of the type which acts to generate the patterned beam 11 by diffraction of the light beam 10. One example of such devices are the diffractive optic projection elements or diffusers sold by Mems Optics Pty. Ltd. Such devices are complicated surface microrelief structures similar to diffraction gratings. Whilst the optical transformation of the light beam 10 to the patterned beam 11 is based on the optical principle of diffraction, the mathematics of the structure of such devices is specifically designed in each case to produce a distinct optical transformation in order to produce a desired patterned image when the patterned beam 11 is projected onto a viewing screen. Each diffractive optic projection element is highly dependent on the wavelength of the light beam used The transparent windows formed by the superposed uncovered portions 7 and 8 of the security document may be formed in a variety of ways. The opacifying layers 5 and 6 may be coated onto the opposing faces 3 and 4 so as to initially leave these areas uncovered. Alternatively, the opacifying layers 5 and 6 may be applied firstly to the entire surface of the banknote and a laser source or other etching device may be used to remove the opacifying layer from that area. According to one technique, a laser source emits a continuous or pulsed beam of laser light that impinges on and acts on one side of the security document 1. The beam initially contacts the opacifying layer 6 leading to localized heat build-up in the layer due to the adsorption of radiation by that layer. Eventually the internal bonds and cohesive forces of the layer structure weaken and break down leading to ablation or removal of the particles from the layer 6 in the region of the area 8. The laser beam, having completely penetrated the layer 6, travels through the transparent substrate 2 substantially unimpeded until it impinges on the surface of layer 5 located on the side of the security document 1. Little or no absorption of the radiation takes places while the beam travels through the substrate 2 and hence little or no heat build-up or consequential damage to the film occurs. When the laser beam 11 impinges on the layer 5, a similar ablation process occurs whereby particles are removed from the surface thereof in the region of the area 7. This leaves two clear or transparent areas 7 and 8 which are in register on both sides of the substrate 2 and which thus form an at least partially transparent area or window through the security document.

Additionally, the security document 1 may comprise a protective transparent coating 12 and 13 in order to protect the optical projection element and increase the security document's resistance to wear.

The authenticity of the above described security document may be simply verified without requiring the use of dedicated and complex light emitting and viewing devices. As can be appreciated from FIG. 2, the placement of the optical projection element within or superposed with the window through the security document 1 by the uncovered portions 7 and 8 enables the light beam portion 10a to pass from a light bean source through the security document, where it is transformed into a patterned beam of selected design, and projected onto a viewing surface. The authenticity of the security document may be simply verified by positioning the security document such that the light beam is transmitted through the at least partially transparent portion 7,8 and the patterned beam is projected onto a viewing surface, and then verifying the presence of a patterned image formed by the impingement of the patterned beam on the viewing surface.

Figure 3:
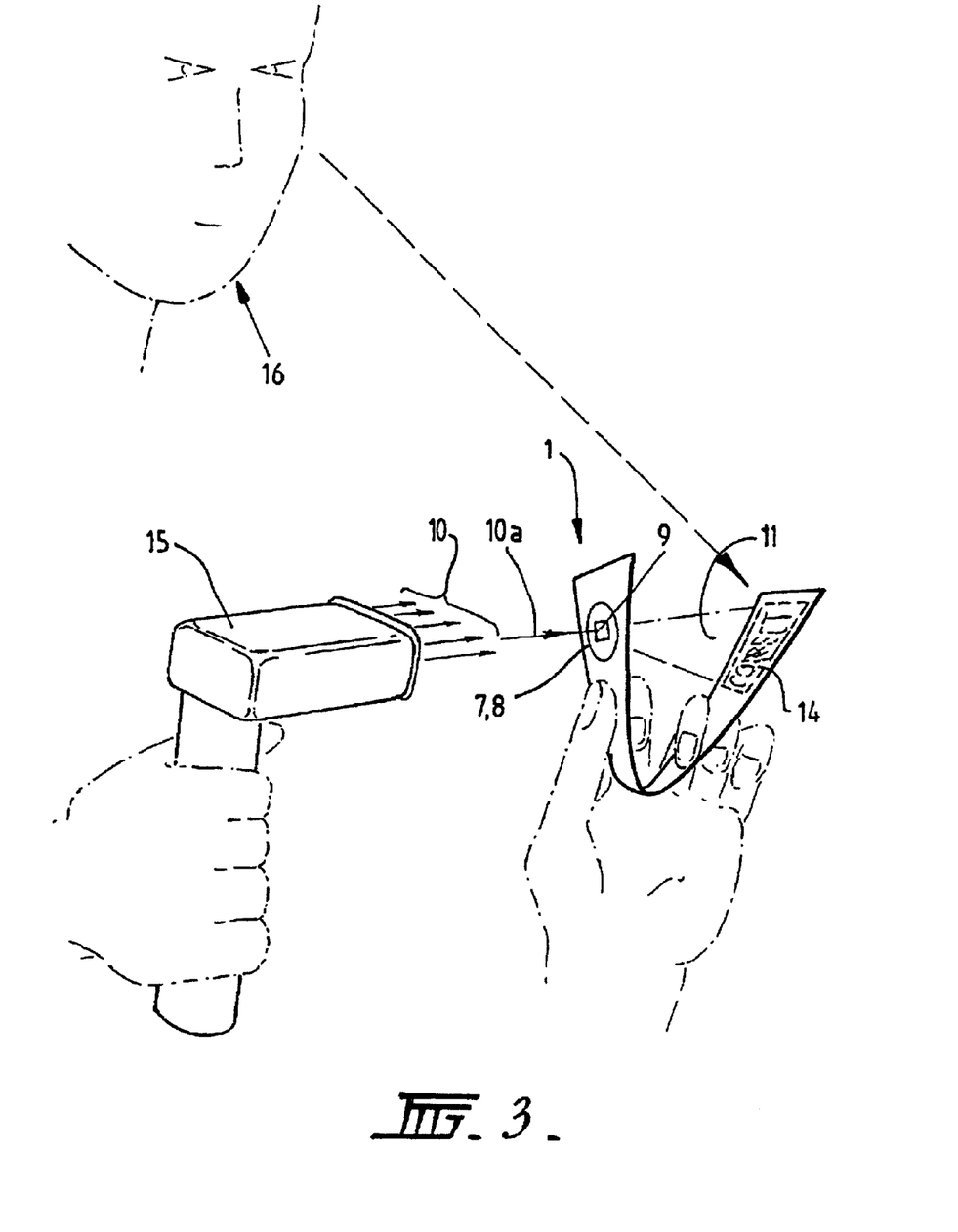
FIG. 3 is a schematic view of the verification of the authenticity of the security document of FIG. 1.

Conveniently, the security document 2 also includes a substantially opaque portion 14 which acts as the viewing surface upon which the pattern beam 11 is projected. As best seen in FIG. 3, the substantially opaque portion 14 is located on the security document 1 such that the security document may be folded to bring the substantially opaque portion 14 into the path of the patterned beam 11 projected from the optical projection element 9. This way, the security document 1 provides not only the security device of an optical projection element which transforms light from a light beam source into a patterned beam of selected design, but also provides a convenient means for verifying the authenticity of the selected design. In order to facilitate the ease with which the substantially opaque portion 14 may be brought into the path of the patterned beam 11, the substantially opaque portion 14 and the at least partially transparent portion 7,8 are remote from each other.

In order that the intensity of the light passing through the optical projection element is maximized, and the resulting patterned image made clearer, the light beam source preferably acts to generate a directional light beam, rather than acting as an omnidirectional light source.

As seen in FIG. 3, the light beam source may conveniently be a point-of-sale light source device 15. A vast number of supermarkets, medium to small businesses and other retail and sales outlets have now introduced Point Of Sale (POS) systems to speed up the check-out of sales and to improve inventory control. Such POS systems rely upon the use of a directional light source to project a beam onto a bar code and a computer to analyse the reflected properties of the light beam. The use of such a POS light source device in the present invention obviates the need for a dedicated light source for use with the present invention. An operator 16 at a retail point of sale outlet or check-out is therefore able to verify the authenticity of the security document 1 simply by using an existing piece of equipment, that is to say, the POS light source device, either with a separate viewing screen or by using a substantially opaque portion of the security document 1 as a viewing screen for verifying the authenticity of,a patterned image projected by the optical projection element 9.

The POS light source device is preferably a laser based light source, but may also be an LED based device, or other type of light source used in POS systems. Such POS light sources will commonly be bar code scanning devices.

There will now be described a method of producing a security document according to the invention. As previously mentioned, the security document 1 may include a layer of at least partially transparent material 2 having opposing faces 3 and 4. At least one face of the substrate 2 is then coated with an opacifying layer. The opacifying layer being applied to leave an uncoated area 7,8 on at least one surface.

Figure 4:
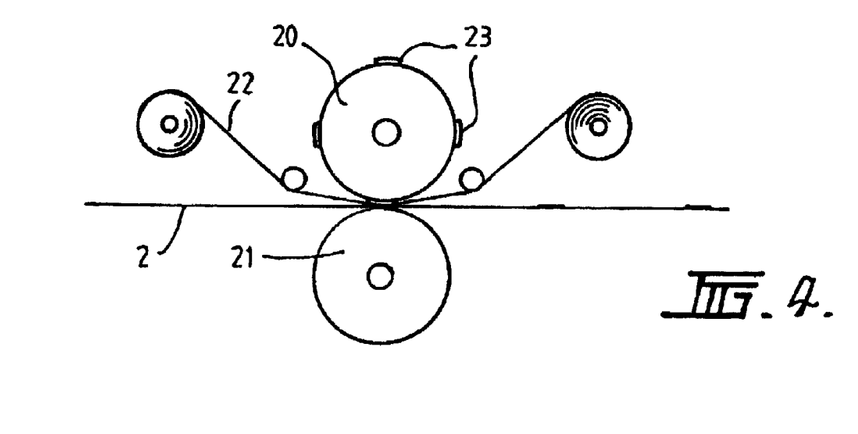
FIG. 4 is a diagrammatic representation of part of the apparatus for transferring an optical projection element from a transfer foil onto the substrate of the security document of FIG. 1.
Figure 5:
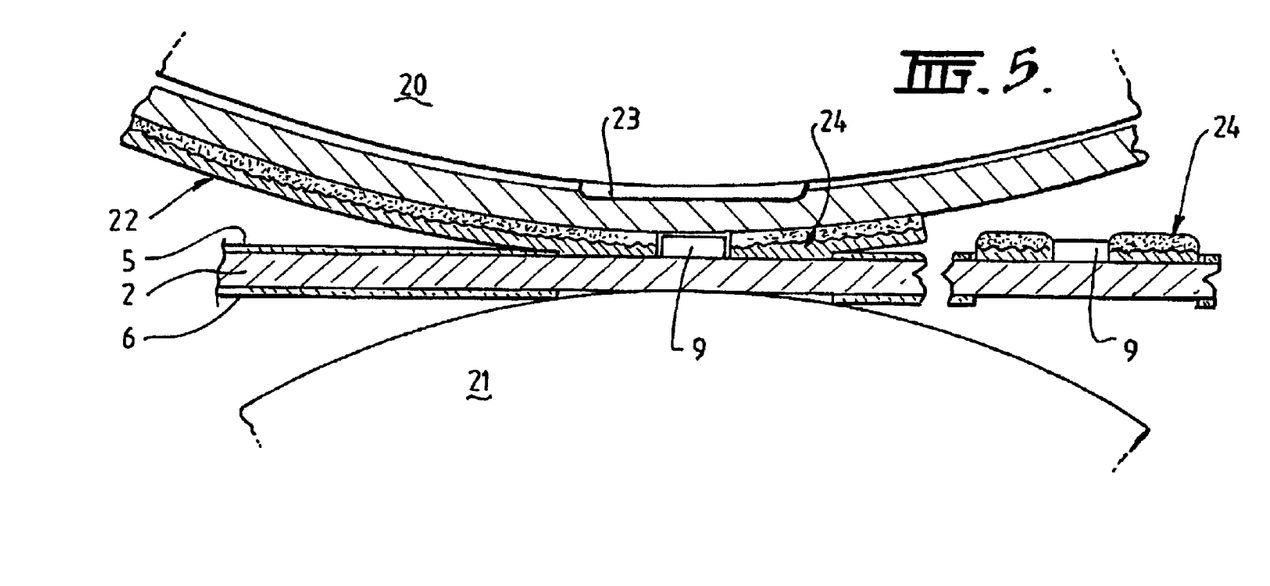
FIG. 5 is a detailed cross-sectional view of the substrate of a variant of the security document, transfer foil and optically variable device for use in the security document.

According to the invention, the optical projection element 9 is then conveyed into position over the uncoated area 7 and transferred onto the substrate 2. One manner in which this conveyance and transfer may be carried out is illustrated in FIG. 4. As seen in this FIGURE, the substrate 2, coated with opacifying layers 5 and 6 except for transparent windows which have been left at intervals corresponding to the locations where the optical projection device will be applied, is fed into an apparatus whereby the optical projection element 9 is conveyed into position of the uncoated area, or window, by and on a transfer foil. In this particular embodiment, the coated substrate 2 is fed between a pair of rollers 20 and 21 together with, and at the same: speed, a transfer foil 22. It would be usual for the coated substrate 2 to be fed between the rollers 20 and 21 and a sheet or web, so that a plurality of banknotes or other security documents are printed across its width but, in that case, it can be readily arranged for the transparent windows of the notes in each row to be precisely lined transversely with the sheet or web. Thus, a separate transfer foil 22 is provided for each note across the width of the sheet.

The upper roll 20 bears on its surface a series of raised pads 23 (see FIG. 6) in line with each transfer foil 22, the pads 23 being spaced apart by a linear distance corresponding exactly with the longitudinal interval between the windows or uncoated areas 7,8 on the printed notes. Either the entire upper roll 20 or the individual raised pads may be heated so that as they rotate, they press the transfer foil firmly against the coated substrate 2 to effect the transfer of the optical projection element 9 from the surface of the foil onto the sheet by hot stamping.

The optical projection element may also be transferred onto the substrate 2 by embossing, or any other convenient technique.

Finally, the printed note or security document in sheet or roll form, bearing the optical projection element, is then subjected to a further coating process in which the thin coating of protective and transparent material 12,13 is applied to both surfaces of the sheet in order to protect the security document 1 from damage. After this final coating operation, the completed bank notes are separated by guillotining in the conventional fashion.

Figure 6:
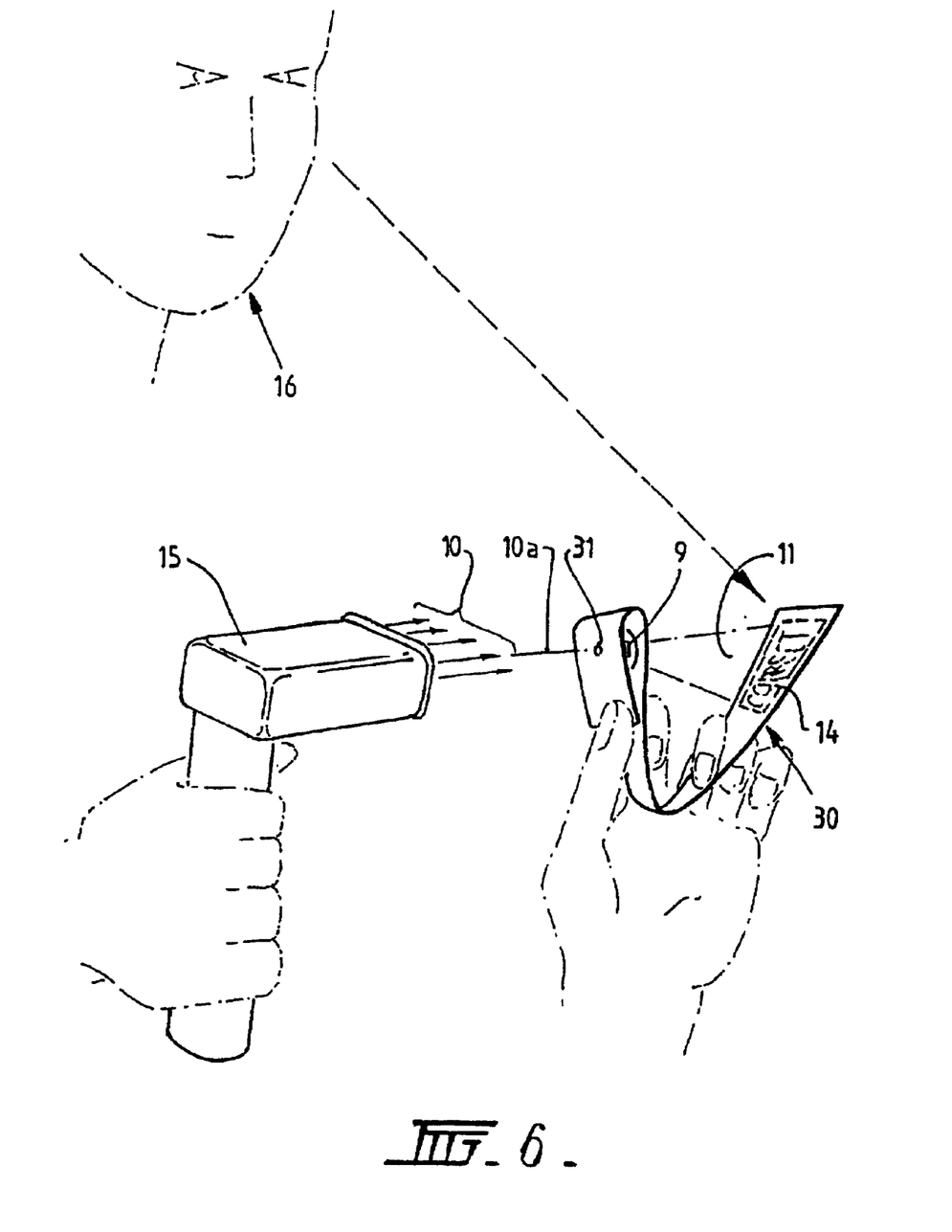
FIG. 6 is a schematic view of the verification of the authenticity of a variant of the security document of FIG. 1.

In addition, one or more optically variable devices may also be conveyed into position over the uncoated area 7,8 of the security document 1 and transferred onto the substrate 2 together with the optical projection element 9. As shown in FIG. 6, the transfer foil 22 may also bear an optically variable device 24, such as a reflective diffraction grating, moire grating, etc.

Turning now to FIG. 6, there is shown a method of verifying the authenticity of a first variant of the security document 1. The security document 30, in addition to the first at least partially transparent portion 7, 8 and optical projection element 9, also includes a second at least partially transparent portion 31. This second at least partially transparent portion 31 may be created in the same manner as first partially transparent portion 7, 8. The dimensions of the second transparent portion 31 are such as to allow the transmission of only a portion 10a of the light beam 10 from the light beam source 15 through the security document 30 and onto the optical projection element 9. In this way, the second transparent portion 31 acts as a pseudo point light source and avoids the transmission of other portions of the light beam 10 through the first transparent portion 7, 8 onto the viewing surface 14. The transmission of such additionally portions of the light beam 10 may interfere with the verification of the authenticity of the security document by creating undesirable optical effects with either the patterned beam or the opacifying surface of the security document.

When in use, and as shown in FIG. 6, the security document 30 may be folded so that the light beam portion 10a only of the light beam 10 from the light beam source passes firstly through the second at least partially transparent portion 31 before being transmitted through the first at least partially transparent portion 7, 8. As was the case in FIG. 3, the projected beam 11 may either be caused to impinge upon a separate viewing surface or upon an opacifying portion of the security document 30 which acts as such a viewing surface.

The second at least partially transparent portion 31 may be formed in the same manner as the first transparent portion 7, 8. Accordingly, when the opacifying layer or layers 5, 6 are applied to the transparent substrate 2, in addition to a first uncoated area being left, a second uncoated area may also be left.

Moreover, the security document may include an optical image or device which is applied to the opacifying portion in the region of the viewing surface 14. Such an optical image or device would interact with the patterned beam impinging on the viewing surface to create a visual security effect. For example, the optical image or device may be a printed image substantially corresponding to or complimenting the patterned image projected onto the viewing surface.

By way of example, the patterned image may be the characters "$20", and the optical image or device may be constituted by the same "$20" characters, printed onto the surface of the opacifying portion so that the patterned image and the optical image or device are superimposed. Alternatively, for example, the patterned image and the optical image or device may be complimentary, so that the patterned image may comprise the characters "$ 0" whilst the optical image or device comprises the character "2".

The optical image or device may also comprise a reflective foil OVD or other like device which interferes with the patterned beam projected onto the viewing surface. Such a device may be applied to the opacifying layer in the same manner as the optical projection element, as described above.

Figure 7:
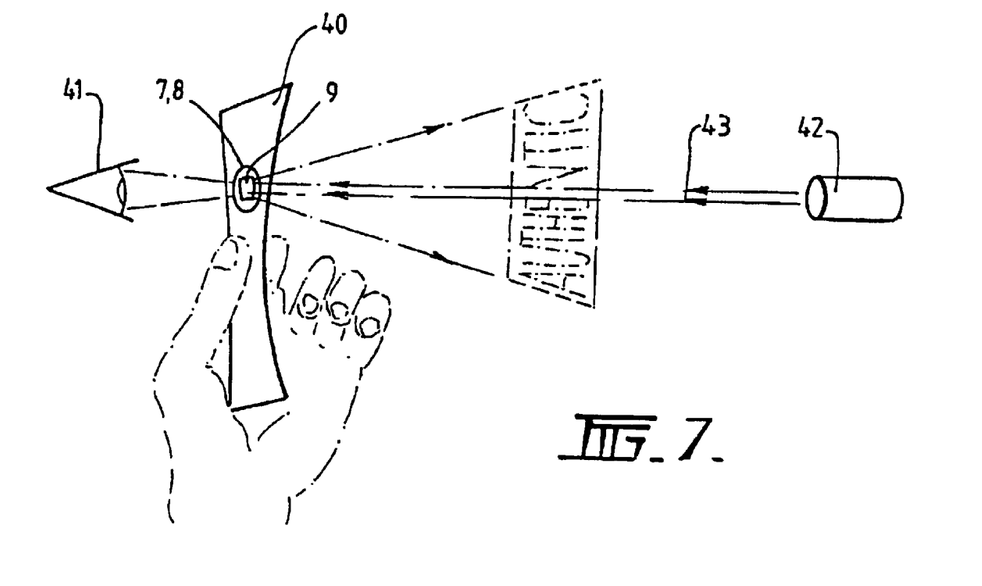
FIG. 7 is a schematic view of the verification of the authenticity of another variant of the security document of FIG. 1.

FIG. 7 shows a method of verifying the authenticity of another variant of the security document. The security document 40, includes, as described previously, a first at least partially transparent portion 7,8 and optical projection element 9. It has been observed, by the present applicants, that if the security document 40 is positioned so as to enable a user 41 to look at the light beam source 42 through the first at least partially transparent portion 7,8, that a patterned image corresponding to the patterned beam will appear in the user's field of vision, at a point between the light source and the security document. Diffractive optical projection elements normally intended for use with red LED or other monochromatic light have been found to produce such "virtual" verification images even when using a white light source. Preferably, the light source 42 produces substantially collumated light. In order to achieve this, the light beam source 42 may be located at a sufficiently remote distance from the security document that the light beam 43 passing through the optical projection element 9 is substantially collumated light.

Figure 8:
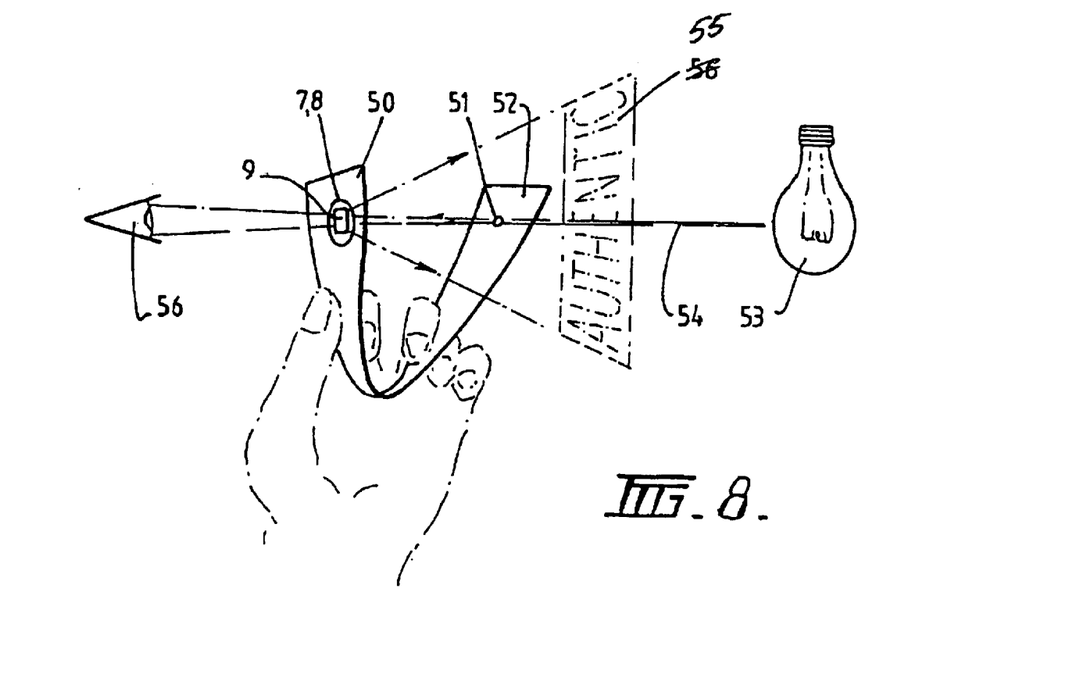
FIG. 8 is a schematic view of the verification of the authenticity of yet another of the security document of FIG. 1.

In yet another embodiment of the invention, as shown in FIG. 8, the security document, here referenced 50, may also include a second at least partially transparent portion 51, constituting a window or pinhole through a surrounding opacifying portion 52. Accordingly, a screen is created having a small window therethrough. This screen may be placed between a light source 53 and the optical projection element 9 such that the light beam 54 passing through the window 51 is caused to be substantially collumated light. In this way, the light source 53 may be constituted by a point source of light, including white light, such as a conventional household light globe from a desk lamp or down light, or a car headlight or variety of other light globes. Conveniently, the first and second at least partially transparent portions 50 and 51 are located remote from each other in order to enable the convenient placing of the screen 52 and window 51 in the path of the light beam 54.

As above, it has been observed that, in this arrangement, a user is able to look at the light beam source 53 through the first at least partially transparent portion and to observe the presence of a patterned image 55 corresponding to the pattern beam projected onto the user's eye 56, this virtual image appearing between the security document 50 and the source of light 53.

Finally, it is to be understood that various modifications and/or additions may be made to the security document, method of verifying the authenticity of a security document and method of producing a security document without departing from the ambit of the present invention.

In particular, the present invention may be used to generate color-separated images for verification of the authenticity of the security document. In embodiments of the invention using non-monochromatic light, such as white light, diffractive optical project elements may be used which diffract different colors within the light beam passing through the security document in different ways. For example, a diffractive optical element may be used which acts that part of the image used to verify the authenticity of the security document appears in one color (e.g. red) whilst another part of the image appears in another color (e.g. blue). The verification image would thus appear as a number of discrete, spatially separated elements each of which is a different color.

What is claimed is:

1. Method of verifying the authenticity of a security document, the security document including a first at least partially transparent portion, an opacifying portion, and an optical projection element within or superposed with the first at least partially transparent portion, the optical projection element acting to transform a light beam passing from a light beam source through said first at least partially transparent portion into a patterned beam of selected design, the method including the steps of:

positioning the security document such that the light beam is transmitted through the first at least partially transparent portion and the patterned beam is projected onto a viewing surface;

verifying the presence of a patterned image by the impingement of the patterned beam on the viewing surface; and folding the security document such that the patterned beam is caused to impinge upon the opacifying portion which thus acts as the viewing surface.

2. Method according to claim 1, wherein the opacifying portion of the security document is remote from the first at least partially transparent portion.

3. Method according to claim 1, wherein the light beam source is a directional light beam source.

4. Method according to claim 3, wherein the light beam source is a point-of-sale light source device.

5. Method according to claim 4, wherein the point-of-sale light source device is a laser or an LED based device.

6. Method according to claim 5, wherein the light beam source is a bar code scanner.

7. Method according to claim 1, wherein the optical projection element acts to transform a light beam passing from a light beam source through said first at least partially transparent portion into a patterned beam of selected design by diffraction of the light beam transmitted through the security document.

8. Method according to claim 1, wherein the security document includes an optical image or device, applied to the opacifying portion, which interacts with the patterned beam impinging on the opacifying portion to create a visual security effect, the method further including the step of:

verifying the presence of the visual security effect.

9. Method according to claim 8, wherein optical image or device is a printed image substantially corresponding to or complementing the patterned image projected onto the viewing surface.

10. Method according to claim 8, wherein the optical image or device is a reflective foil OVD or other like device.

11. Method of verifying the authenticity of a security document, the security document including a first at least partially transparent portion and an optical projection element within or superposed with the first at least partially transparent portion, the optical projection element acting to transform a light beam passing from a light beam source through said first at least partially transparent portion into a patterned beam of selected design, the method including the steps of:

forming an at least partially transparent substrate having first and second opposing surfaces;

coating at least one face of the substrate with an opacifying layer, the opacifying layer being applied to form a viewing surface on the security document and to leave a first uncoated area on the at least one face;

conveying the optical projection element into position over the first uncoated area;

transferring the optical projection element onto the substrate;

folding the security document such that the light beam is transmitted through the first at least partially transparent portion and the patterned beam is projected onto the viewing surface; and verifying the presence of a patterned image by the impingement of the patterned beam on the viewing surface.

12. Method according to claim 11, wherein the optical projection element is conveyed into position over the first uncoated area by and on a transfer foil.

13. Method according to claim 12, wherein the optical projection element is transferred from the foil onto the substrate by hot stamping.

14. Method according to any one of claims 11 to 13, wherein at least one optically variable device is conveyed into position over the first uncoated area and transferred onto the substrate together with the optical projection element.

15. Method according to claim 11, wherein the optical projection element is transferred onto or into the substrate by embossing.

16. Method according to claim 11, wherein the opacifying layer is applied to also leave a second uncoated area on the at least one face, the second uncoated area acting as a pseudo point light source when a light beam passes through the security document in the second uncoated area.

17. Method according to claim 11, and further including the step of:

applying an optical image or device to an opacifying portion of said opacifying layer.

18. Method according to claim 17, wherein the optical image or device is applied to the opacifying portion by printing.

19. Method according to claim 17, wherein the optical image or device is a reflective foil OVD or like device.

20. Method of verifying the authenticity of a security document, the security document including a first at least partially transparent portion, a second at least partially transparent portion, and an optical projection element within or superposed with the first at least partially transparent portion, the optical projection element acting to transform a light beam passing from a light beam source through said first at least partially transparent portion into a patterned beam of selected design, the method including the steps of:

positioning the security document such that the light beam is transmitted through the first at least partially transparent portion and the patterned beam is projected onto a viewing surface;

verifying the presence of a patterned image by the impingement of the patterned beam on the viewing surface; and folding the security document such that only part of the light beam from the light beam source passes firstly through the second at least partially transparent portion before being transmitted through said first at least partially transparent portion, said second at least partially transparent portion thus acting as a pseudo point light source.

21. Method of verifying the authenticity of a security document, the security document including a first at least partially transparent portion, and an optical projection element within or superposed with the first at least partially transparent portion, the optical projection element acting to transform a light beam passing from a light beam source through said first at least partially transparent portion into a patterned beam of selected design, the light beam source producing substantially non-collimated light, the method involving the steps of:

positioning the security document so as to enable a user to look at the light beam source through the first at least partially transparent portion, and verifying the presence of an image corresponding to the patterned beam in the user's field of vision; and placing a screen having a window in the security document between the light beam source and the optical projection element by folding the security document such that the light beam from the light beam source passing through the window is substantially collimated light, the screen including an opacifying portion of the security document.

22. Method according to claim 21, wherein the window includes a second at least partially transparent portion of the security document.

23. Method according to claim 22, wherein the first and second at least partially transparent portions are remote from each other in order to enable the window to be conveniently placed between the light beam source and the optical projection element.

24. Security document including a first at least partially transparent portion, an optical projection element within or superposed with the first at least partially transparent portion, the optical projection element acting to transform a light beam passing from a light beam source through the first at least partially transparent portion into a patterned beam of selected design, and an opacifying portion for impingement of the patterned beam thereupon by folding of the security document.

25. Security document according to claim 24, wherein the opacifying portion and the first at least partially transparent portion are remote from each other.

26. Security document according to claim 24, wherein the optical projection element acts to generate the patterned beam by diffraction of the light beam passing through the security document.

27. Security document according to claim 24, wherein the security document includes an optical image or device, applied to the opacifying portion, which interacts with the patterned beam impinging on the opacifying portion to create a visual security effect.

28. Security document including a first at least partially transparent portion, an optical projection element within or superposed with the first at least partially transparent portion, the optical projection element acting to transform a light beam passing from a light beam source through the first at least partially transparent portion into a patterned beam of selected design, an at least partially transparent substrate having first and second opposing faces, and an opacifying layer applied to at least one of the faces, the first at least partially transparent portion resulting from an uncoated area on at least one surface, the opacifying layer forming an opacifying portion for impingement of the patterned beam thereon by folding the security document.

29. Security document including a first at least partially transparent portion, an optical projection element within or superposed with the first at least partially transparent portion, the optical projection element acting to transform a light beam passing from a light beam source through the first at least partially transparent portion into a patterned beam of selected design, and the security document being foldable such that a second at least partially transparent portion is placed between the light beam and the optical projection element for transmitting only part of the light beam from the light beam source, the second at least partially transparent portion thus acting as a pseudo point light source.

30. Security document including a first at least partially transparent portion, an optical projection element within or superposed with the first at least partially transparent portion, the optical projection element acting to transform a light beam passing from a light beam source through said first at least partially transparent portion into a patterned beam of selected design, and a second at least partially transparent portion located remotely from the first at least partially transparent portion, the security document being foldable such that the second at least partially; transparent portion is able to be placed between the light beam source and the optical projection element so that the light beam from the light beam source passing through the second at least partially transparent portion is substantially collimated light.

* * * * *

UNITED STATES PATENT AND TRADEMARK OFFICE
CERTIFICATE OF CORRECTION

PATENT NO. : 6,770,898 B1
DATED : August 3, 2004
INVENTOR(S) : G.J. Wilson et al.

It is certified that error appears in the above-identified patent and that said Letters Patent is hereby corrected as shown below:

Title page,
Item [73], Assignee, "Securency Pty Ltd.," should read -- Securency Pty Ltd, --

Column 10,
Line 56, "wherein optical image" should read -- wherein the optical image --

Column 14,
Line 8, "partially; transparent" should read -- partially transparent --

Signed and Sealed this

Tenth Day of May, 2005

JON W. DUDAS
*Director of the United States Patent and Trademark Office*